(12) United States Patent
Wang et al.

(10) Patent No.: US 10,462,014 B1
(45) Date of Patent: Oct. 29, 2019

(54) POSITIONING NETWORK DEVICES

(71) Applicant: Google LLC, Mountain View, CA (US)

(72) Inventors: Xiaoming Wang, Mountain View, CA (US); Greg Leon, Mountain View, CA (US); Sanjeev Jagannatha Rao, Mountain View, CA (US); Jun Yin, Fremont, CA (US); Peter Chen, Mountain View, CA (US); Dongdong Wang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 34 days.

(21) Appl. No.: 15/806,340

(22) Filed: Nov. 8, 2017

Related U.S. Application Data

(60) Provisional application No. 62/437,003, filed on Dec. 20, 2016.

(51) Int. Cl.
| | |
|---|---|
| *H04B 10/07* | (2013.01) |
| *H04L 12/24* | (2006.01) |
| *H04W 64/00* | (2009.01) |
| *H04W 16/26* | (2009.01) |
| *H04Q 11/00* | (2006.01) |
| *H04B 10/079* | (2013.01) |
| *H04B 10/112* | (2013.01) |
| *H04W 84/22* | (2009.01) |

(52) U.S. Cl.
CPC ......... *H04L 41/12* (2013.01); *H04Q 11/0067* (2013.01); *H04W 16/26* (2013.01); *H04W 64/003* (2013.01); *H04B 10/07953* (2013.01); *H04B 10/1123* (2013.01); *H04L 41/0826* (2013.01); *H04Q 2011/009* (2013.01); *H04Q 2011/0083* (2013.01); *H04W 84/22* (2013.01)

(58) Field of Classification Search
CPC ....... H04B 10/07; H04B 10/079; H04B 10/11
See application file for complete search history.

(56) References Cited

U.S. PATENT DOCUMENTS

| | | | |
|---|---|---|---|
| 7,680,495 B2 | 3/2010 | Abed et al. | |
| 2009/0029645 A1* | 1/2009 | Leroudier | H04B 7/2606 455/7 |
| 2009/0059814 A1 | 3/2009 | Nixon et al. | |
| 2010/0184423 A1* | 7/2010 | Kent | H04W 28/18 455/422.1 |

(Continued)

*Primary Examiner* — Dzung D Tran
(74) *Attorney, Agent, or Firm* — Honigman LLP

(57) ABSTRACT

A method for positioning network devices includes receiving network parameters for a network and determining corresponding installation locations for the end devices based on the network parameters. The network includes at least one network backhaul, relay devices in communication with the network backhaul, and end devices in communication with the relay devices or the network backhaul. The end devices are configured to wirelessly communicate with user devices at the corresponding user locations. The method also includes determining communication connections between at least one of: the end devices and user devices; the relay devices and the at least one network backhaul; the relay devices and the end devices; or the end devices and the at least one network backhaul. The method further includes generating a network topology indicating the determined corresponding locations for the end devices and the determined communication connections.

16 Claims, 5 Drawing Sheets

(56) References Cited

U.S. PATENT DOCUMENTS

| | | | | |
|---|---|---|---|---|
| 2010/0246482 | A1* | 9/2010 | Erceg | H04W 24/02 370/328 |
| 2010/0255848 | A1* | 10/2010 | Abraham | H04W 24/02 455/446 |
| 2016/0380351 | A1* | 12/2016 | Simmonds | H01Q 1/1228 342/359 |

* cited by examiner

POSITIONING NETWORK DEVICES

CROSS REFERENCE TO RELATED APPLICATIONS

This U.S. patent application claims priority under 35 U.S.C. § 119(e) to U.S. Provisional Application 62/437,003, filed on Dec. 20, 2016, which is hereby incorporated by reference in its entirety.

TECHNICAL FIELD

This disclosure relates to allocating and positioning network devices within a network.

BACKGROUND

Service providers may provide content (e.g., television, interne, telephone, etc.) to households of customers using wired connections. The wired connections generally include optical cables, copper cables, and/or other fixed wire-based technologies. When deploying a new network (e.g., an optical access network) in a geographic region, fixed wireless technologies may be used along a last-run portion to wirelessly provide the content to the customer households to reduce build costs and build times associated with deploying/installing wired connections. However, network designers are faced with the challenge of considering numerous fixed-wireless network topology combinations that provide wireless coverage to the customer households, and selecting an optimal topology associated with an acceptable installation cost.

SUMMARY

One aspect of the disclosure provides a method for positioning network devices. The method includes receiving, at data processing hardware, network parameters for a network and determining, by the data processing hardware, corresponding installation locations for the end devices based on the network parameters. The network includes at least one network backhaul, relay devices in communication with the network backhaul, and end devices in communication with the relay devices or the network backhaul. The end devices are configured to wirelessly communicate with user devices at the corresponding user locations. The method also includes determining, by the data processing hardware, communication connections between at least one of: the end devices and user devices; the relay devices and the at least one network backhaul; the relay devices and the end devices; or the end devices and the at least one network backhaul. The method further includes generating, by the data processing hardware, a network topology indicating the determined corresponding locations for the end devices and the determined communication connections.

Implementations of the disclosure may include one or more of the following optional features. In some implementations, the method includes determining corresponding installation locations for the devices based on the network parameters. The network topology may include a map indicating the corresponding installation locations of the relay devices and the end devices, and the determined communication connections.

In some examples, the network parameters include at least one of: corresponding candidate installation locations for the end devices; a wireless coverage criteria of the end devices; a threshold received signal strength indicator (RSSI) at the end devices; a threshold signal-to-interference-plus-noise ratio (SINR) at the end devices; or a minimum communication bandwidth of the end devices. The network parameters may also include at least one of a wireless coverage area of the relay devices, backhaul locations, or a map of a geographical area containing at least a portion of the network. The network backhaul may be configured to wirelessly communicate with the relay devices and the relay devices are configured to wirelessly communicate with at least one of each other or the end devices. The corresponding locations for the end devices may be based on a threshold number of possible point-to-multi-point communication connections between each end device and corresponding user devices.

In some examples, the method includes determining, by the data processing hardware, a projected installation cost for installing the network topology and determining, by the data processing hardware, whether the projected installation cost exceeds a threshold installation cost. When the projected installation cost exceeds a threshold initiation cost, the method may include determining, by the data processing hardware, the corresponding installation locations for the end devices based on the network parameters and the projected installation cost. The method may further include determining, by the data processing hardware, communication connections between at least one of: the end devices and user devices; the relay devices and the at least one network backhaul; the relay devices and the end devices; or the end devices and the at least one network backhaul, based on the projected installation cost.

Determining the communication connection may include, for each end device, determining a line-of-sight (LOS) communication path between the at least one network backhaul and the corresponding end device. The LOS communication path may include communication links between the at least one network backhaul and at least one relay device, and between the at least one relay device and the corresponding end device. The method may also include sending the network topology from the data processing hardware to a screen, causing the screen to display the network topology in a graphical user interface.

Another aspect of the disclosure provides a system for positioning network devices. The system includes data processing hardware and memory hardware in communication with the data processing hardware. The memory hardware stores instructions that when executed on the data processing hardware cause the data processing hardware to perform operations. The operations include receiving network parameters for a network and determining corresponding installation locations for the end devices based on the network parameters. The network includes at least one network backhaul, relay devices in communication with the network backhaul, and end devices in communication with the relay devices or the network backhaul. The end devices are configured to wirelessly communication with user devices at the corresponding user locations. The operations also include determining communication connections between at least one of: the end devices and user devices; the relay devices and the at least one network backhaul; the relay devices and the end devices; or the end devices and the at least one network backhaul. The operations further include generating a network topology indicating the determined corresponding locations for the end devices and the determined communication connections.

This aspect may include one or more of the following optional features. In some implementations, the operations include determining corresponding installation locations for the relay devices based on the network parameters. The network topology may include a map indicating the corresponding installation locations of the relay devices and the end devices, and the determined communication connections.

In some examples, the network parameters include at least one of corresponding candidate installation locations for the end devices, a wireless coverage criteria of the end devices, a threshold received signal strength indicator (RSSI) at the end devices, a threshold signal-to-interference-plus-noise ratio (SINR) at the end devices, or a minimum communication bandwidth of the end devices. The network parameters may also include at least one of a wireless coverage area of the relay devices, backhaul locations, or a map of a geographical area containing at least a portion of the network. Determining the corresponding locations for the end devices may be based on a threshold number of possible point-to-multi-point communication connections between each end device and corresponding user devices.

The operations may further include determining, by the data processing hardware, a projected installation cost for installing the network topology and determining, by the data processing hardware, whether the projected installation cost exceeds a threshold installation cost. When the projected installation cost exceeds a threshold installation cost, the operations may include determining, by the data processing hardware, the corresponding installation locations for the end devices based on the network parameters and the projected installation cost. The operations may also include determining, by the data processing hardware, communication connections between at least one of: the end devices and user devices; the relay devices and the at least one network backhaul; the relay devices and the end devices; or the end devices and the at least one network backhaul, based on the projected installation cost.

In some implementations, determining the communication connections includes, for each end device determining a line-of-sight (LOS) communication path between the at least one network backhaul and the corresponding end device. The LOS communication path may include communication links between the at least one network backhaul and at least one relay device, and between the at least one relay device and the corresponding end device. The operations may also include sending the network topology from the data processing hardware to a screen, causing the screen to display the network topology in a graphical user interface.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
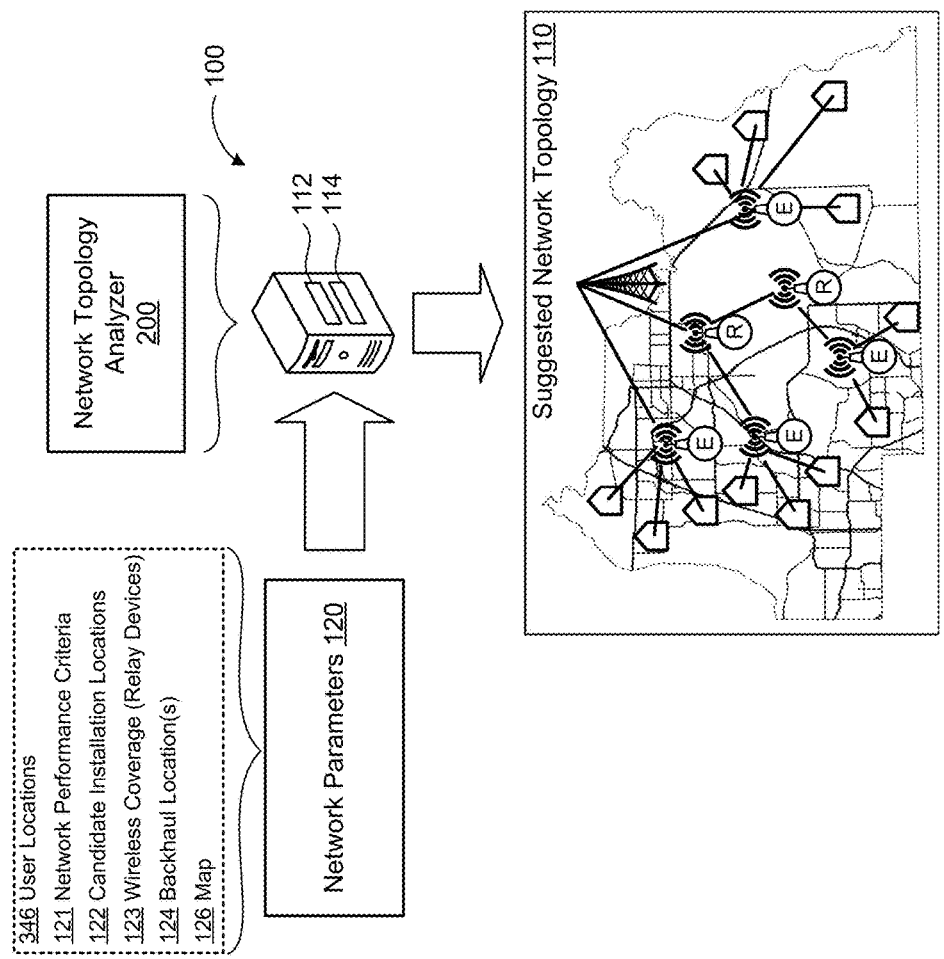
FIG. 1 is a schematic view of an example system for generating network topologies.
Figure 2:
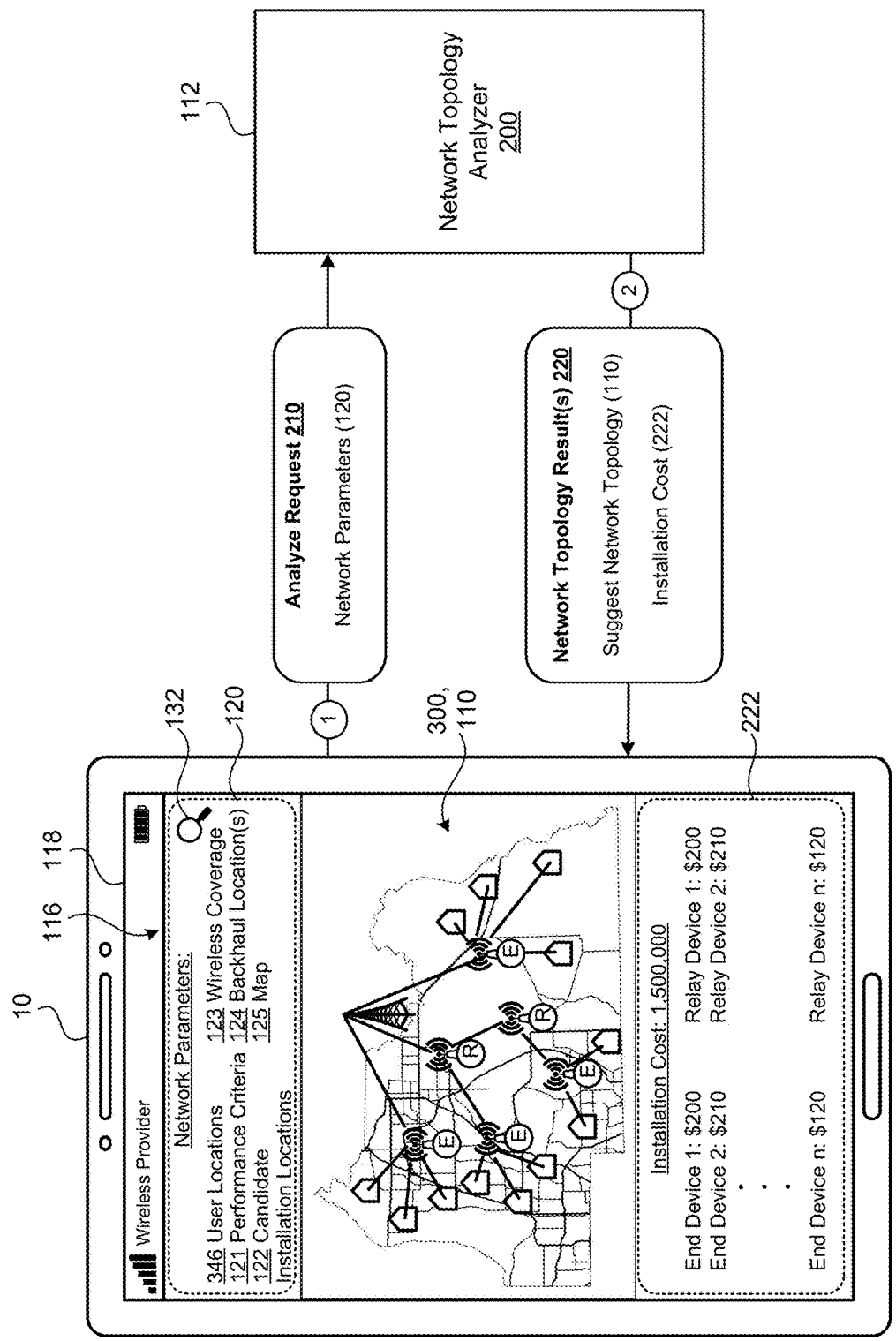
FIG. 2 is a schematic view of an example computing device executing a network topology analyzer.
Figure 3:
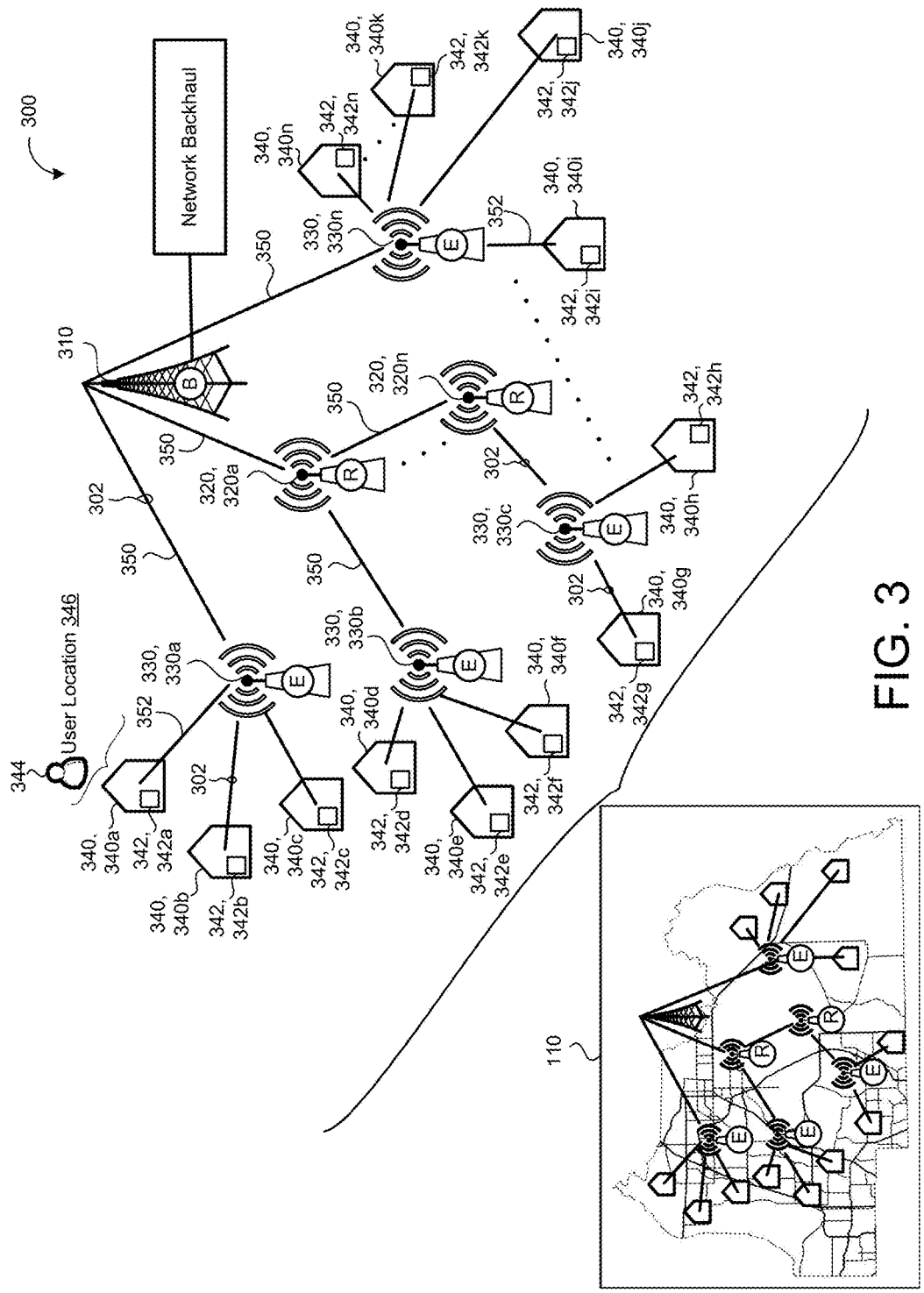
FIG. 3 is a schematic view of an example suggested network topology.

Referring to FIGS. 1-3, in some implementations, a system 100 includes data processing hardware 112 (e.g., one or more computing devices, such central processing units (CPUs)) in communication with memory hardware 114. In some examples, the system 100 is a distributed system (e.g., cloud environment) having scalable / elastic computing resources (e.g., the data processing hardware 112) and/or storage resources (e.g., the memory hardware 114). The memory hardware 114 stores instructions that when executed on the data processing hardware 112 cause the data processing hardware 112 to perform operations for executing a network topology analyzer 200 configured to determine a suggested network topology 110 for a network 300. The suggested network topology 110 provides suggested installation locations E, R for positioning network devices 310, 320, 330 of the network 300 and suggested communication connections 350 between the network devices 310, 320, 330. The network 300 includes at least one network backhaul 310, one or more relay devices 320, 320a-n in communication with the network backhaul(s) 310, and end devices 330, 330a-n in communication with the network backhaul(s) 310 and/or the relay devices 320.

Referring to FIG. 3, in some implementations, the network 300 corresponds to a fixed wireless network 300 configured to wirelessly deliver communication signals 302 through wireless communication links 350 between the network backhaul 310 and user devices 342, 342a-n associated with users 344 (also referred to as customers or subscribers). The user devices 342, 342a-n are typically located at premises 340, 340a-n of the users 344. Each user 344 may be associated with a user location 346, which may be based on the address of the premises 340 of the user 344 or geographic coordinates of the premises 340.

The user devices 342 may correspond to customer premises equipment (CPE) including any terminal and associated equipment located at the premises 340 of the user 344 and connected to one of the end devices 330 via an associated wireless communication link 352 at a demarcation point ("demarc"). The demarc is a point established in a house, building, or complex to separate customer equipment from service provider equipment. CPE generally refers to devices such as telephones, routers, switches, residential gateways (RG), set-top boxes, fixed mobile convergence products, home networking adapters, or Internet access gateways that enable the user 344 to access services of a communications service provider and distribute them around the premises 340 of the user 344 via a local area network (LAN). Accordingly, a user device 342 may include a network box equipped with multiple Internet protocol (IP) interfaces to serve as an access point (e.g., wireless or wired connection) for the LAN at the premises 340 of the user 344, for example, by offering Wireless Fidelity (Wi-Fi) connectivity to the LAN and/or by offering multiple wired connections capable of establishing connections with target electronic devices. Therefore, the user device 342 may serve as a router to provide internet service to the target electronic devices located within the premises 340 (e.g., building, house, office, etc.). A target electronic device may be a TV box, a storage box, a tablet, a voice-over-internet protocol (VoIP) device, a phone or smartphone, a computer (or a laptop, a portable electronic device), etc.

Each end device 330 may include a fixed access site configured to wirelessly transmit/receive communication signals 302 to and from multiple user devices 342 located within a wireless coverage area of the end device 330. Accordingly, the end devices 330 may provide point-to-multipoint communications such that each end device 330 may serve multiple (e.g., tens to hundreds) target user devices 342, 342a-n located at the premises 340, 340a-n of the users 344. In some implementations, one or more of the end devices 330, 330a-n include multiple-input multiple-output (MIMO) circuitry for communicating with: the network backhaul 110 or the relay device 320; and one or more user devices 342, 342a-n located at the premises 340, 340a-n of the users 344. Wireless communication links 352 between the end devices 330, 330a-n and the user devices 342, 342a-n provides a last-run portion, also known as the "last mile" (e.g., curb-to-home) or last-run link) for wirelessly distributing the communication signals 302 to the customer premises 340, 340a-n. Using the end devices 330 for wirelessly serving the user devices 342 over the last-run portion reduces build costs and build times compared to laying down physical lines, cables, fibers, etch over the last-run portion. The end devices 330, 330a-n may include the MIMO circuitry and may transmit the communication signals 302 through the communication links 352 to the user devices 342 over the millimeter wave spectrum. Each communication link 352 may require a direct line-of-sight between the end device 330 and the corresponding user device 342. In some examples, the user devices 342 are capable of accessing interne content through the received communication signals 302 at speeds of at least 100 megabits per second (Mbps) during peak times.

The at least network backhaul 310 connects to a wired network and is configured to provide content from the wired network to each of the end devices 330, which are configured to wirelessly serve (e.g., via the wireless communication links 352) the user devices 342, 342a-n located at the premises 340, 340a-n of the users 344. In some examples, the network backhaul 310 provides a high speed network to the user devices 342, 342a-n by routing wireless communication signals 302 through the end devices 330. The network 300 may include additional network backhauls 310 depending on the size of the geographic area. In some implementations, the network backhaul 310 establishes a communication connection 350 directly with at least one end device 330 to wirelessly transmit/receive the communication signal 302 to and from the at least one end device 330. In these implementations, the at least one end device 330 and the network backhaul 310 include a direct line-of-sight (LOS) communication path therebetween for establishing the direct communication connection 350 between the network backhaul 310 and the at least one end device 330.

In some scenarios, no direct LOS communication path exists between the network backhaul 310 and at least one of the end devices 330. In these scenarios, at least one relay device 320 may serve as a wireless bridge for establishing the communication connection 350 between the network backhaul 310 and the corresponding end device 330. For instance, the relay device 320 may establish a first communication connection 350 with the wireless backhaul 310 and a second communication connection 350 with the corresponding end device 330. Here, the relay device 320 may receive a communication signal 302 through the first communication connection 350 from the network backhaul 310 and route the communication signal 302 through the second communication connection 350 to the corresponding end device 330. In some examples, two or more relay devices 320 route a communication signal 302 between the network backhaul 310 and an end device 330. Accordingly, the relay devices 320 are configured to communicate with at least one of each other or the end devices 330.

In some examples, the network backhaul 310 uses a high-frequency spectrum to communicate with the relay devices 320 and/or the end devices 330. For instance, the network backhaul, the relay devices 320, and the end devices 330 may use the millimeter wave spectrum for communicating with one another over the communication connections 350.

Referring back to FIG. 1, in some implementations, the network topology analyzer 200 receives network parameters 120 for the network 300 and determines corresponding installation locations E for the end devices 330 based on the network parameters 120. The network parameters 120 include the user locations 346 of the users 344 of the network 300. Each user location 346 may be determined based on the address or geographic coordinates of the premises 340 of the corresponding user 344. As each user 344 may be associated with a corresponding user device 342, 342a-n configured to wirelessly communicate with one of the end devices 330, 330a-n at the premises 340, the user location 346 may refer to the location of the corresponding user device 342. Generally, it is desirable that the corresponding installation location E for each end device 330 maximizes the coverage area of the corresponding end device 330 such that the corresponding end device 330 wirelessly serves a maximum number of user devices 342, 342a-n (e.g., the number of premises 340). Thus, by determining installation locations E for the end devices 330 that maximizes the number of user devices 342, 342a-n served by a given end device 330, the network 300 may use as few end devices 330, 330a-n as possible to thereby reduce building costs of the network 300. In some examples, the corresponding installation locations E for the end devices 330 is based on a threshold number of possible point-to-multi-point communication connections 350 (e.g., communication links 352) between each end device 330 and the corresponding user devices 342. Additionally, the installation location E determined by the network topology analyzer 200 for each end device 330 enables the corresponding end device 330 to establish a LOS communication connection 350 with the network backhaul 310 or one of the relay devices 320.

The network topology analyzer 200 may use one or more algorithms to determine the corresponding installation locations E for the end devices 330. For instance, the network topology analyzer 200 may use Tabu search, heuristic algorithms, and/or linear programming techniques to determine the corresponding installation locations E for the end devices 330 based on the network parameters 120.

In some examples, the network parameters 120 also include network performance criteria 121 for the end devices 330. For instance, the network performance criteria 121 may include at least one of a wireless coverage criteria of the end devices 330, a threshold received signal strength indicator (RSSI) at the end devices 330, a threshold signal-to-interference-plus-noise ratio (SINR) at the end device 330, or a minimum communication bandwidth of the end devices 330. The threshold RSSI and the threshold SINR may indicate minimum values of RSSI and SINR needed by each end device 330 to provide adequate wireless coverage to a group of user devices 342. In some implementations, the minimum communication bandwidth of the end devices 330 is about 60 Mbps. Additionally or alternatively, the network parameters 120 may include corresponding candidate installation locations 122 for the end devices 330. Here, each candidate installation location 122 may include geographic coordinates such as a latitude, a longitude, and altitude of the candidate installation location 122. For instance, a candidate installation location 122 associated with a low altitude for a given latitude and longitude may indicate that the corresponding candidate installation location 122 is unsuitable an end device 330 to establish communication connections 350 with the network backhaul 310, the relay devices 320, and/or the user devices 342. For instance, positioning an end device 330 at a candidate installation location associated with a low altitude and surrounded by mountains may preclude the end device 330 from the ability to establish LOS communication connections 350 with at least one of the network backhaul 310, the relay devices 320, or the user devices 342.

In some examples, the network topology analyzer 200 also determines corresponding installation locations R for the relay devices 320, 320a-n based on the network parameters 120. Here, the network parameters 120 may include at least one of a wireless coverage area 123 of the relay devices 320, backhaul location(s) 124, or a map 125 of a geographical area containing at least a portion of the network 300. Each backhaul location 124 may include a corresponding location associated with each network backhaul 310 of the network 300. The map 125 of the geographical area may include a polygon (or other shape) area on a map 125 that covers a specified area for installing end devices 330 and/or relay devices 320. In some examples, the map 125 may show a topography of the geographical area and/or terrain features, such as forests and/or bodies of water, within the geographical area.

As with the determined corresponding installation locations E for the end devices 330, 330a-n, the network topology analyzer 200 may use one or more algorithms to determine the corresponding installation locations R for the relay devices 320, 320a-n. For instance, the network topology analyzer 200 may use Tabu search, heuristic algorithms, and/or linear programming techniques to determine the corresponding installation locations R for the relay devices 320 based on the network parameters 120.

In some implementations, the network topology analyzer 200 determines the communication connections 350 after determining the installation locations for the end devices 330. For instance, the network topology analyzer 200 may determine communication connections 350 between at least one of: the end devices 330 and the user devices 342; the relay devices 320 and the at least one network backhaul 310; the relay devices 320 and the end devices 330; or the end devices 330 and the at least one network backhaul 310. In some examples, for each end device 330, the network topology analyzer 200 determines the communication connections 350 by determining a LOS communication path between the at least one network backhaul 310 and the corresponding end device 330. In some examples, the LOS communication path includes a direct communication connection 350 between the network backhaul 310 and the corresponding end device 330. In other examples, the LOS communication path includes communication links between the at least one network backhaul 310 and at least one relay device 320, and between the at least one relay device 320 and the corresponding end device 330.

Thereafter, the network topology analyzer 200 may generate the suggested network topology 110 indicating the determined corresponding installation locations E for the end devices 330 and the determined communication connections 350. In the examples shown, the suggested network topology 110 includes a map indicating the corresponding installation locations R, E of the relay devices 320, 320a-n and the end devices 330, 330a-n.

FIG. 2 shows a computing device 10 in communication with the network topology analyzer 200, which executes on the data processing hardware 112 of the system 100 of FIG. 1. The computing device 10 may be associated with a network designer and the network designer may use the computing device 10 to access the network topology analyzer 200 for designing the network 300. The computing device 10 may display a graphical user interface (GUI) 116 on a screen 118 in communication with the data processing hardware 112. The GUI 116 may enable the network designer to input the network parameters 120. In some examples, the network designer may search for network parameters 120 by selecting a search button 132 displayed in the GUI 116. The computing device 10 may send the network parameters 120 to the network topology analyzer 200. The network parameters 120 may include at least one of the user locations 346, the performance criteria 121 for the end devices 230, the candidate installation locations 122 for the end devices 230, the wireless coverage area 123 for the relay devices 320, the backhaul locations 124, and the map 125 of the geographical area containing at least a portion of the network 300.

In some implementations, the computing device 10 sends an analyze request 210 to the network topology analyzer 200. The analyze request 210 includes the network parameters 120 and requests the network topology analyzer 200 to generate a suggested network topology 110 based on the network parameters 120. For instance, the network topology analyzer 200 may receive the network parameters 120 in the analyze request 210 and determine the corresponding installation locations E for the end devices 330, 330a-n based on the network parameters 120. The network topology analyzer 200 may also determine the corresponding installation locations R for the relay devices 320, 320a-n based on the network parameters 120.

Moreover, the network topology analyzer 200 determines the communication connections 350 between at least one of: the end devices 330 and the user devices 342, 342a-n (e.g., network boxes); the relay devices 320, 320a-n and the at least one network backhaul 310; the relay devices 320 and the end devices 330; or the end devices 330 and the at least one network backhaul 310. In some examples, the network topology analyzer 200 determines, for each end device 330, a LOS communication path between the at least one network backhaul 310 and the corresponding end device 330. Here, the LOS communication path may include a direct communication connection 350 between the at least one network backhaul 310 and the corresponding end device 330, or the LOS communication path may include multiple communication links (e.g., multiple communication connections 350) between the at least one network backhaul 310 and at least one relay device 320, and between the at least one relay device 320 and the corresponding end device 330. For instance, the LOS communication path between the corresponding end device 330 and the at least one network backhaul 310 may require multiple communication links when the at least one network backhaul 310 and the corresponding end device 330 are separated by a threshold communication distance and/or no direct LOS exists therebetween.

Accordingly, the network topology analyzer 200 generates the suggested network topology 110 indicating the determined corresponding installation locations E for the end devices 330 and the determined communication connections 350. The suggested network topology 110 may also indicate the determined corresponding installation locations R for the relay devices 320. In some implementations, the network topology analyzer 200 determines a projected installation cost 222 for installing the suggested network topology 110. For instance, the projected installation cost 222 may include the cost to install each end device 330, 330a-n and/or the cost to install each relay device 320, 320a-n.

In some examples, the network topology analyzer 200 sends network topology results 220 to the computing device 10 associated with the network designer. The network topology results 220 may include at least one of the suggested network topology 110 or the projected installation cost 222 for installing the suggested network topology. In response to receiving the network topology results 220 from the network topology analyzer 200, the screen 118 of the computing device 10 may display the suggested network topology 110 and/or the projected installation cost 222 in the GUI 116. In the example shown, the screen 118 is displaying the suggested network topology 110 and the projected installation cost 222 in the GUI 116. The suggested network topology 110 includes the map of the network 300 of FIG. 3 indicating the determined communication connections 350 and the corresponding installation locations R, E of the relay devices 320 and the end devices 330. In some examples, the map includes a heat map of all of the premises 340, 340a-n wirelessly covered by the end devices 330 of the suggested network topology 110. The displayed installation cost 222 includes a total installation cost to install all of the network devices (e.g., the end devices 330 and the relay devices 320) of the suggested network topology 110. The displayed installation cost 222 may also show the installation cost associated with each end device 330 and each relay device 320.

In some implementations, the network topology analyzer 200 may determine whether the projected installation cost 222 exceeds a threshold installation cost. When the projected installation cost 222 exceeds the threshold installation cost, the network topology analyzer 200 may determine new corresponding installation locations E for the end devices 330 (and optionally the relay devices 320) based on the network parameters 120 and the projected installation cost 222, and determine new communication connections 350 based on the projected installation cost 222. Accordingly, the network topology analyzer 200 may generate a new suggested network topology 110 when a previously generated suggested network topology 110 includes a projected installation cost 222 that exceeds the threshold installation cost. The network topology analyzer 200 may iteratively generate suggested network topologies 110 until one of the suggested network topologies 110 is associated with an installation cost 222 less than the threshold installation cost.

Figure 4:
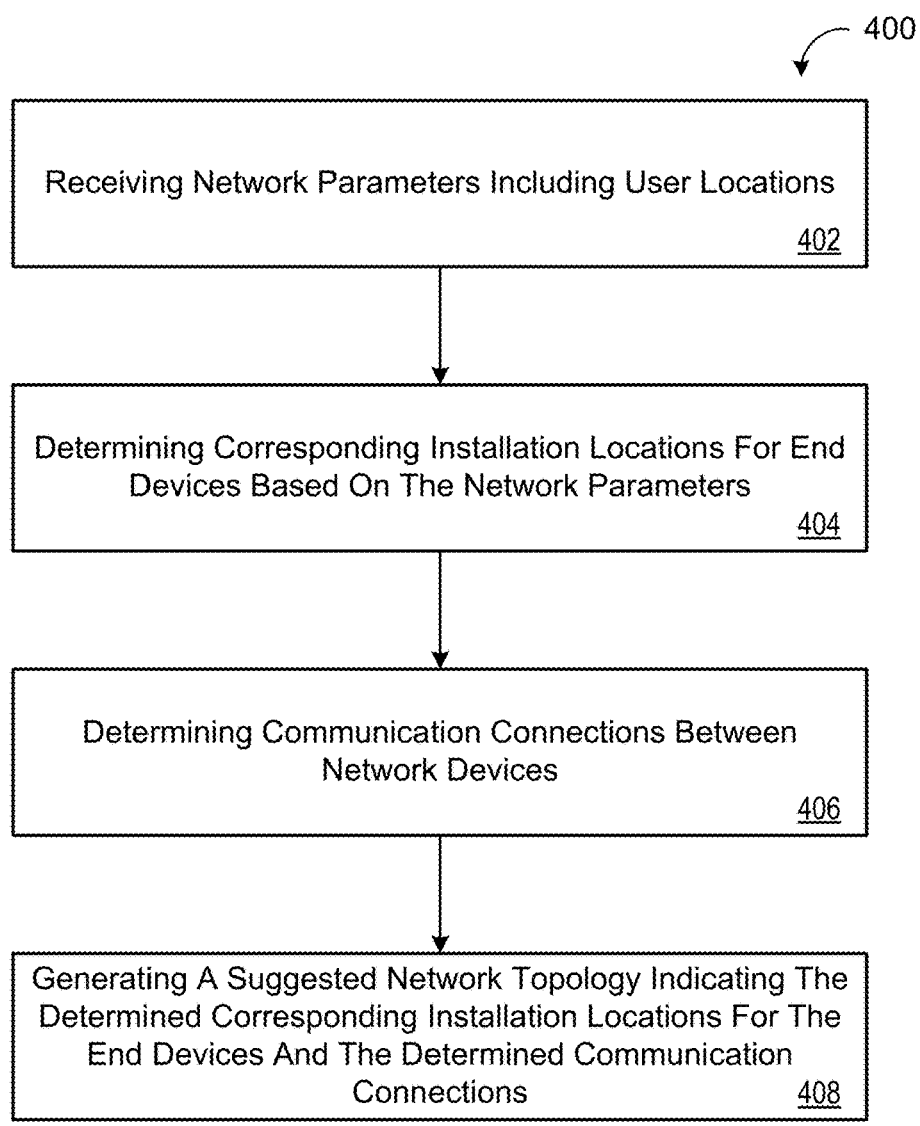
FIG. 4 is a schematic view of an example arrangement of operations for a method of positioning network devices.

FIG. 4 provides an example arrangement of operations for a method of positioning network devices 320, 330 in a fixed wireless network 300. The network 300 includes at least one network backhaul 310, relay devices 320, 320a-n in communication with the network backhaul 310, and end devices 330, 330a-n in communication with the relay devices 320 or the network backhaul 310. The end devices 330 are configured to wirelessly communicate with user devices 342, 342a-n at corresponding user locations 346. Each user location 346 may refer to a location of a corresponding user/customer 344 associated with a corresponding user device 342, 342a-n. Each user location 346 may include an address of the premises 340, 340a-n of the corresponding user 344. In some examples, the end devices 330 employ MIMO circuitry and wirelessly communicate with the user devices 342 over the millimeter wave spectrum.

At block 402, the method 400 includes receiving, at data processing hardware 112, network parameters 120 for the network 300. The network parameters 120 include the user locations 346. At block 404, the method 400 includes determining, by the data processing hardware 112, corresponding installation locations E for the end devices 330 based on the network parameters 120. At block 406, the method 400 includes determining, by the data processing hardware 112, communication connections 350 between at least one of: the end devices 330 and the user devices 342; the relay devices 320 and the at least one network backhaul 310; the relay devices 320 and the end devices 330; or the end devices 330 and the at least one network backhaul 310. At block 408, the method 400 includes generating, by the data processing hardware 112, a suggested network topology 110 indicating the determined corresponding installation locations E for the end devices 330 and the determined communication connections 350.

In some implementations, the method 400 also includes determining, by the data processing hardware 112, corresponding installation locations R for the relay devices 320 based on the network parameters 120. The network topology 110 may include a map indicating the corresponding installation locations R, E for the relay devices 320 and the end devices 330, and the determined communication connections 350.

The network parameters 120 may include the performance criteria 121 for the end devices 330. For instance, the performance criteria 121 may include at least one of corresponding candidate installation locations 122 for the end devices 330, a wireless coverage criteria of the end devices 330, a threshold RSSI at the end devices 330, a threshold SINR at the end devices 330, or a minimum communication bandwidth of the end devices 330. Additionally or alternatively, the network parameters 120 may include at least one of a wireless coverage area 123 of the relay devices 320, backhaul locations 124, or a map 125 of a geographical area containing at least a portion of the network 300. Each backhaul location 124 may include a corresponding location associated with each network backhaul 310 of the network 300. The map 125 of the geographical area may include a polygon (or other shape) area on a map 125 that covers a specified area for installing end devices 330 and/or relay devices 320.

The at least one network backhaul 310 may be configured to wirelessly communicate with the relay devices 320 and the relay devices 320 may be configured to wirelessly communicate with at least one of each other or the end devices 330. In some examples, determining the corresponding installation locations E for the end devices 330 is based on a threshold number of possible point-to-multi-point communication connections 350 between each end device 330 and corresponding user devices 342.

In some implementations, the method also includes determining, by the data processing hardware 112, a projected installation cost 222 for installing the network topology 110, and determining, by the data processing hardware 112, whether the projected installation cost 222 exceeds a threshold installation cost. When the projected installation cost 222 exceeds a threshold installation cost, the method 400 may include determining, by the data processing hardware 112, the corresponding installation locations E for the end devices 330 based on the network parameters 120 and the projected installation cost 222, and determining, by the data processing hardware 112, communication connections 350 based on the projected installation cost 222.

Figure 5:
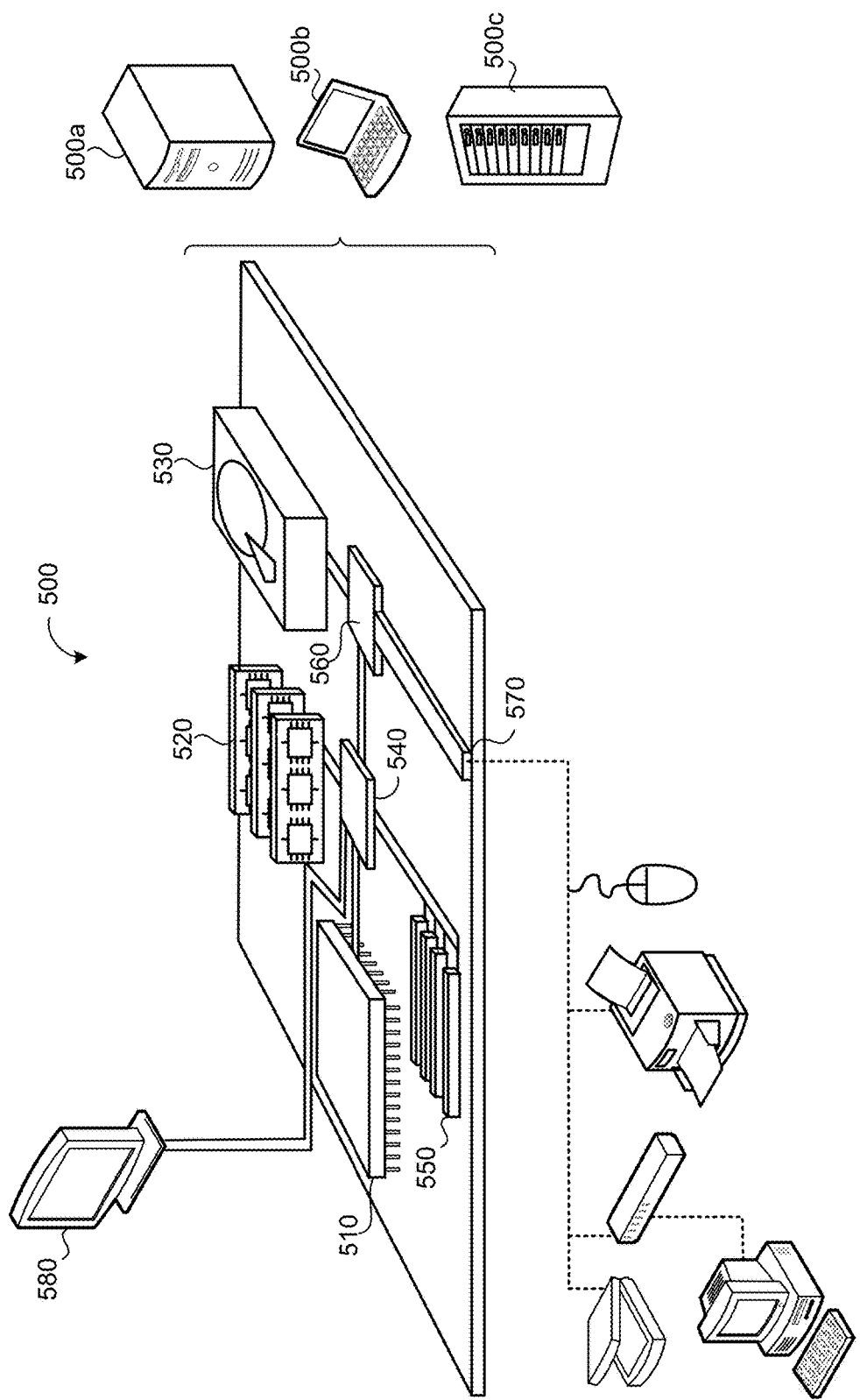
FIG. 5 is schematic view of an example computing device that may be used to implement the systems and methods described in this document.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to low speed bus 570 and storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM) / programmable read-only memory (PROM) / erasable programmable read-only memory (EPROM) / electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and low-speed expansion port 570. The low-speed expansion port 570, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, network parameters for a network, the network parameters comprising user locations, the network comprising:
      at least one network backhaul;
      relay devices in communication with the network backhaul; and
      end devices in communication with the relay devices or the network backhaul, the end devices configured to wirelessly communicate with user devices at the corresponding user locations;
   determining, by the data processing hardware, corresponding installation locations for the end devices based on the network parameters;
   determining, by the data processing hardware, corresponding installation locations for the relay devices based on the network parameters;
   determining, by the data processing hardware, communication connections between at least one of:
      the end devices and the user devices;
      the relay devices and the at least one network backhaul;
      the relay devices and the end devices; or
      the end devices and the at least one network backhaul; and
   generating, by the data processing hardware, a network topology indicating:
      the determined corresponding installation locations for the relay devices and the end devices; and
      the determined communication connections.

2. The method of claim 1, wherein the network parameters further comprise at least one of corresponding candidate installation locations for the end devices, a wireless coverage criteria of the end devices, a threshold received signal strength indicator (RSSI) at the end devices, a threshold signal-to-interference-plus-noise ratio (SINR) at the end devices, or a minimum communication bandwidth of the end devices.

3. The method of claim 1, wherein the network parameters further comprise at least one of a wireless coverage area of the relay devices, backhaul locations, or a map of a geographical area containing at least a portion of the network.

4. The method of claim 1, wherein the at least one network backhaul is configured to wirelessly communicate with the relay devices and the relay devices are configured to wirelessly communicate with at least one of each other or the end devices.

5. The method of claim 1, wherein determining the communication connections comprises, for each end device determining a line-of-sight (LOS) communication path between the at least one network backhaul and the corresponding end device.

6. The method of claim 1, wherein the LOS communication path comprises communication links between the at least one network backhaul and at least one relay device, and between the at least one relay device and the corresponding end device.

7. A method comprising:
   receiving, at data processing hardware, network parameters for a network, the network parameters comprising user locations, the network comprising:
      at least one network backhaul;
      relay devices in communication with the network backhaul; and
      end devices in communication with the relay devices or the network backhaul, the end devices configured to wirelessly communicate with user devices at the corresponding user locations;
   determining, by the data processing hardware, corresponding installation locations for the end devices based on a threshold number of possible point-to-multipoint communication connections between each end device and corresponding user devices;
   determining, by the data processing hardware, communication connections between at least one of:
      the end devices and the user devices;
      the relay devices and the at least one network backhaul;
      the relay devices and the end devices; or
      the end devices and the at least one network backhaul; and
   generating, by the data processing hardware, a network topology indicating the determined corresponding installation locations for the end devices and the determined communication connections.

8. A method comprising:
   receiving, at data processing hardware, network parameters for a network, the network parameters comprising user locations, the network comprising:
      at least one network backhaul;
      relay devices in communication with the network backhaul; and
      end devices in communication with the relay devices or the network backhaul, the end devices configured to wirelessly communicate with user devices at the corresponding user locations;
   determining, by the data processing hardware, corresponding installation locations for the end devices based on the network parameters;

determining, by the data processing hardware, communication connections between at least one of:
  the end devices and the user devices;
  the relay devices and the at least one network backhaul;
  the relay devices and the end devices; or
  the end devices and the at least one network backhaul;
generating, by the data processing hardware, a network topology indicating the determined corresponding installation locations for the end devices and the determined communication connections;
determining, by the data processing hardware, a projected installation cost for installing the network topology;
determining, by the data processing hardware, whether the projected installation cost exceeds a threshold installation cost; and
when the projected installation cost exceeds the threshold installation cost:
  determining, by the data processing hardware, the corresponding installation locations for the end devices based on the network parameters and the projected installation cost; and
  determining, by the data processing hardware, communication connections between at least one of:
    the end devices and user devices;
    the relay devices and the at least one network backhaul;
    the relay devices and the end devices; or
    the end devices and the at least one network backhaul, based on the projected installation cost.

9. A system comprising:
data processing hardware; and
memory hardware in communication with the data processing hardware, the memory hardware storing instructions that when executed on the data processing hardware cause the data processing hardware to perform operations comprising:
  receiving network parameters for a network, the network parameters comprising user locations, the network comprising:
    at least one network backhaul;
    relay devices in communication with the network backhaul; and
    end devices in communication with the relay devices or the network backhaul, the end devices configured to wirelessly communicate with user devices at the corresponding user locations;
  determining corresponding installation locations for the end devices based on the network parameters;
  determining corresponding installation locations for the relay devices based on the network parameters;
  determining communication connections between at least one of:
    the end devices and user devices;
    the relay devices and the at least one network backhaul;
    the relay devices and the end devices; or
    the end devices and the at least one network backhaul; and
  generating a network topology indicating:
    the determined corresponding locations for the relay devices and the end devices; and
    the determined communication connections.

10. The system of claim 9, wherein the network parameters further comprise at least one of corresponding candidate installation locations for the end devices, a wireless coverage criteria of the end devices, a threshold received signal strength indicator (RSSI) at the end devices, a threshold signal-to-interference-plus-noise ratio (SINR) at the end devices, or a minimum communication bandwidth of the end devices.

11. The system of claim 9, wherein the network parameters further comprise at least one of a wireless coverage area of the relay devices, backhaul locations, or a map of a geographical area containing at least a portion of the network.

12. The system of claim 9, wherein the at least one network backhaul is configured to wirelessly communicate with the relay devices and the relay devices are configured to wirelessly communicate with at least one of each other or the end devices.

13. The system of claim 9, wherein determining the communication connections comprises, for each end device determining a line-of-sight (LOS) communication path between the at least one network backhaul and the corresponding end device.

14. The system of claim 9, wherein the LOS communication path comprises communication links between the at least one network backhaul and at least one relay device, and between the at least one relay device and the corresponding end device.

15. A system comprising:
data processing hardware; and
memory hardware in communication with the data processing hardware, the memory hardware storing instructions that when executed on the data processing hardware cause the data processing hardware to perform operations comprising:
  receiving network parameters for a network, the network parameters comprising user locations, the network comprising:
    at least one network backhaul;
    relay devices in communication with the network backhaul; and
    end devices in communication with the relay devices or the network backhaul, the end devices configured to wirelessly communicate with user devices at the corresponding user locations;
  determining corresponding installation locations for the end devices based on a threshold number of possible point-to-multi-point communication connections between each end device and corresponding user devices;
  determining communication connections between at least one of:
    the end devices and user devices;
    the relay devices and the at least one network backhaul;
    the relay devices and the end devices; or
    the end devices and the at least one network backhaul; and
  generating a network topology indicating the determined corresponding locations for the end devices and the determined communication connections.

16. A system comprising:
data processing hardware; and
memory hardware in communication with the data processing hardware, the memory hardware storing instructions that when executed on the data processing hardware cause the data processing hardware to perform operations comprising:
  receiving network parameters for a network, the network parameters comprising user locations, the network comprising:
    at least one network backhaul;

relay devices in communication with the network backhaul; and end devices in communication with the relay devices or the network backhaul, the end devices configured to wirelessly communicate with user devices at the corresponding user locations;

determining corresponding installation locations for the end devices based on the network parameters;

determining communication connections between at least one of:
- the end devices and user devices;
- the relay devices and the at least one network backhaul;
- the relay devices and the end devices; or
- the end devices and the at least one network backhaul; and generating a network topology indicating the determined corresponding locations for the end devices and the determined communication connections;

determining a projected installation cost for installing the network topology;

determining whether the projected installation cost exceeds a threshold installation cost; and when the projected installation cost exceeds a threshold installation cost:
- determining the corresponding installation locations for the end devices based on the network parameters and the projected installation cost; and
- determining communication connections between at least one of:
  - the end devices and user devices;
  - the relay devices and the at least one network backhaul;
  - the relay devices and the end devices; or
  - the end devices and the at least one network backhaul, based on the projected installation cost.

* * * * *